US008925435B2

(12) United States Patent
Greenleaf

(10) Patent No.: US 8,925,435 B2
(45) Date of Patent: Jan. 6, 2015

(54) FLEXIBLE GRIP DIE-ALIGNMENT ARRANGEMENT

(76) Inventor: Richard J. Greenleaf, Manchester, MA (US)

( * ) Notice: Subject to any disclaimer, the term of this patent is extended or adjusted under 35 U.S.C. 154(b) by 869 days.

(21) Appl. No.: 12/924,139

(22) Filed: Sep. 21, 2010

(65) Prior Publication Data

US 2011/0067538 A1 Mar. 24, 2011

Related U.S. Application Data

(63) Continuation-in-part of application No. 12/214,924, filed on Jun. 24, 2008, now abandoned, which is a continuation-in-part of application No. 11/450,526, filed on Jun. 9, 2006, now abandoned.

(51) Int. Cl.

| | |
|---|---|
| ***B26D 7/26*** | (2006.01) |
| ***B21D 45/08*** | (2006.01) |
| ***B23P 11/02*** | (2006.01) |
| ***B21D 28/26*** | (2006.01) |
| ***B21D 28/34*** | (2006.01) |
| ***B26D 7/18*** | (2006.01) |
| *B26F 1/40* | (2006.01) |

(52) U.S. Cl.

CPC ................ *B21D 28/26* (2013.01); *B21D 28/34* (2013.01); *B26D 7/1818* (2013.01); *B26D 7/2614* (2013.01); *B26D 7/1854* (2013.01); *B26D 7/2628* (2013.01); *B26F 1/40* (2013.01)

USPC ............... 83/143; 83/684; 83/698.31; 29/450

(58) Field of Classification Search

USPC .................. 83/13, 684, 140, 588, 640, 698.1, 83/699.41, 138, 139, 686, 133, 552, 83/698.31, 698.91, 143; 403/314, 366, 403/370, 372, 374, 309, 362, 371, 302, 289, 403/290; 29/450

See application file for complete search history.

(56) References Cited

U.S. PATENT DOCUMENTS

| | | | | |
|---|---|---|---|---|
| 245,696 | A * | 8/1881 | Black | 403/309 |
| 288,746 | A * | 11/1883 | Vielhaber | 403/314 |
| 691,448 | A * | 1/1902 | Cowell | 403/309 |
| 992,352 | A * | 5/1911 | Hansler | 403/314 |
| 1,183,190 | A * | 5/1916 | Hansell | 411/279 |
| 3,023,034 | A * | 2/1962 | Chung | 403/366 |
| 3,603,624 | A * | 9/1971 | Attermeyer | 403/300 |
| 3,851,977 | A * | 12/1974 | Boole | 403/16 |
| 4,620,814 | A * | 11/1986 | May | 403/314 |
| 5,146,832 | A * | 9/1992 | Wilson et al. | 83/698.91 |
| 6,679,147 | B1 * | 1/2004 | Chaulklin | 83/698.91 |

* cited by examiner

*Primary Examiner* — Ghassem Alie
(74) *Attorney, Agent, or Firm* — Don Halgren

(57) ABSTRACT

A solid tool gripping and alignment plate, for accurately gripping and holding a tool placed therein in perfect alignment. The tool gripping and alignment plate consists of a flat unitary tool gripping plate with a smooth non-circular opening formed in the tool gripping plate for gripping a tool therein fully 360 degrees about a tool's periphery upon adjustment of the gripping plate. A single threaded adjustment member is arranged through a side of the gripping plate for biasing a portion of the smooth non-circular opening in the tool gripping plate from a non-circular shape into the circular shaped opening for circumferentially gripping of a tool therein.

10 Claims, 3 Drawing Sheets

FLEXIBLE GRIP DIE-ALIGNMENT ARRANGEMENT

FIELD OF THE INVENTION

This invention relates to punch press assemblies and more particularly to tool-holding grip arrangements for gripping tools to permit very accurate alignment arrangements to facilitate the alignment of opposing tools utilized to pierce a sheet of material such as for example in a punch press, and is a continuation-in-part of application Ser. No. 12/214,924 filed Jun. 24, 2008 now abandoned and Ser. No. 11/450,526 filed Jun. 9, 2006, now abandoned each incorporated herein by reference in their entirety.

BACKGROUND OF THE INVENTION

Discussion of the Prior Art

Compound tooling is currently utilized by hundreds of manufacturers to produce thousands of different types of washers made from aluminum, brass, copper, nylon, steel utilized in almost everything society touches. Washers are for example, utilized in any product with nuts and bolts or moving parts. The inside diameter and the outside diameter of these washers or other punched parts have become more critical and significant for use in the manufacture of high-quality precision devices.

Prior art tool and die sets have to be made slightly loose, and those tools use clamping screws which thus influences a die in a tool holder. That in turn establishes inaccuracies and a loss of concentricity of the alignment of those tools.

It is an object of the present invention to overcome the disadvantages of the prior art.

It is a further object of the present invention to provide a tool set in which the punch and die members are in exact accurate concentric alignment with one another.

It is a further object of the present invention to provide a unique and simple tool gripping and alignment plate which firmly grips a tool in a bias able irregular opening, which, when biased forms a perfect circle for gripping the tool, especially useful in die punching operations.

BRIEF SUMMARY OF THE INVENTION

The present invention comprises a die set assembly or arrangement for the manufacture of punched parts from a traveling web or sheet of material such as metal or plastic to produce washers or the like.

The die set assembly or arrangement of the present invention comprises a base portion which comprises a lowermost die shoe. The lowermost die shoe has a central bore extending therethrough. A compound punch holder plate is bolted to the upper side of the die shoe and has a central bore extending there through of a second diameter. A stripper holder plate is reciprocably supported on an arrangement of shoulder screws arranged between the lowermost die shoe and the stripper holder plate itself. Die springs compressibly support the stripper holder plate over the compound punch holder plate.

A compound punch is fixedly secured in the second diameter bore of the compound punch holder plate. The compound punch extends into the stripper holder plate. The compound punch has a bore in coaxial alignment with the bore in the lowermost die shoe. A stripper ring adjustably encloses the uppermost end of the compound punch within the stripper holder plate.

The die set arrangement of the present invention also comprises an upper portion which comprises the upper punch holder plate. The upper punch holder plate is disposed parallel to and reciprocably movable with respect to the stripper holder plate on the base portion of the die set arrangement. The punch holder plate is supported on guide pins which are received in guide bushings at their lowermost end. A center punch holder plate is bolted to the lower side of the punch holder plate. The center punch holder plate has a bore which adjustably arranged about a center punch there within. A die holder plate is supported by those same pins onto the lower side of the center punch holder plate. The die holder plate has a central opening of a third diameter. The opening in the die holder plate is arranged to adjustably enclose and align a die member therewithin. The die holder plate has a central opening which encloses an annular knockout member. The annular knockout member has a central bore through which the center punch, supported at its upper end by the center punch holder plate, is supported.

Reciprocating motion of the upper portion of the die set arrangement, with its die arranged downwardly therefrom, impacting the stripper holder plate supported on the lower portion of the die set arrangement, with a traveling web of material moving therebetween, effects the manufacture of a punched part by virtue of the center punch and the die mating with the compound punch and its associated stripper holder.

The concentric alignment each of these components is critical to the manufacture of a proper punched part.

The center punch holder plate and the die holder plate in the uppermost portion of the die set arrangement, and the stripper holder plate and the compound punch holder plate in the lower portion of the die set arrangement, each utilize a flexible grip arrangement to secure the tool components within their commonly aligned bores.

The center punch holder plate for example, has a central bore for squeezably pinching and holding a tool concentrically therewithin, with respect to adjacent tool holding plates. The central bore in the exemplary center punch holder plate is slightly out of round at one side location thereof. That side location also includes the beginning or distal end of a curvilinear cut through the center punch holder plate which curvilinear cut extends in a generally semi-circular or somewhat "J" shaped pattern around the central bore. That generally semicircular cut extends from the bore wall, and around the bore at least 180° therearound, looking somewhat liked a "curved finger". In one embodiment of that semicircular cut, the second or proximal end of that cut curves slightly radially outwardly and away from the center of that central bore within the center punch holder plate.

A threaded bore is arranged through the side edge of the exemplary center punch holder plate and extends up to the radially outer surface of that generally semi circular cut, meeting the cut at a location of about one third the distance from the distal end of that cut. An adjustment bolt is disposed within that threaded bore so as to effect (or release) a bias on the radially outward side of the cut, when that adjustment bolt is rotated within that bore. That generally semicircular cut through the exemplary center punch holder plate in effect creates a "flexible grip" finger. A bias inwardly by the adjustment bolt against the finger presses a semi-circular curved wall portion of that finger slightly inwardly radially, so as to distort the irregular bore and hence create a perfect circular hole in that central bore. When for example, a tool such as a center punch is placed within the center punch holder plate, and the adjustment bolt is tightened with respect to that finger, the center punch is now squeezed tightly within a distorted bore now comprising a perfect circular hole therewithin. By aligning the respective center bores of the adjacent holder plates within the upper portion and the lower portion of the die set arrangement, the matable tool components therein may be held in perfect axial alignment. In one preferred embodiment of the present invention, the center punch holder plate, the die holder plate, the stripper holder plate and the compound punch holder plate may have an initial or pilot bore drilled therethrough to establish the initial alignment thereof. The slight irregularity of those respective bores may be machined when the generally semicircular cut is made in each respective holder plate. Thus when a tool is clamped within respective holder plate, that bore within that holder plate becomes a perfect circle. When no tool is clamped within the respective holder plates, the bore within those respective holder plates is irregular and "out of round" in its undistorted configuration.

The invention thus comprises a die press assembly for producing punched parts from a travelling web of material, the die press comprising: a lower die shoe securing a compound punch holder plate thereon, the compound punch holder biasedly gripping a compound punch tool therein, the lower die shoe also supporting a reciprocably movable stripper holder plate, wherein the compound punch extends slideably through a biasedly gripped stripper holder tool in the stripper holder plate; an upper punch holder movable with respect to the lower die shoe, the upper punch holder having a center punch holder plate which biasedly grips a center punch tool therewithin, and a die holder plate fixedly attached to the center punch holder plate with a biasedly gripped die tool slideably enclosing the center punch, wherein each of the biasedly gripped tools are in co-axial alignment in distortable bores in their respective plates. The distortable bores each biasedly grip their respective tools by a gripping finger comprising a curvilinear member defined by a cut through its plate, the gripping finger both comprising and extending around at least 180 degrees of the circumference of the bore. The gripping finger which defines at least part of the wall of the bore, is biasable inwardly about a pivot location of the side of the bore, from a non-circular configuration into a circular configuration. The gripping finger is defined by a generally "J" shaped cut in the plate in which it is arranged. The gripping finger is biased inwardly by the adjustable threaded member. The cut defining the gripping member has a first end which extends through a side wall portion of the bore in the plate. The cut defining the gripping member has a second end which extends radially outwardly from its circumferential path, and wherein the pivot location is generally diametrically opposite the first end of the cut in the wall of the bore, defining the gripping finger. The adjustable threaded member has a longitudinal axis which is in alignment with the first end of the cut defining the gripping finger. The bore in its undistorted orientation is comprised of a pair of semi-circular walls, each having its own center of curvature. The bore in its distorted orientation is comprised of a pair of semi-circular walls, each having a common center of curvature, and now forming a circle.

The invention also comprised a method of gripping a tool for use in a punch press assembly, comprising: machining a non-circular walled bore in a tool supporting plate; machining a curvilinear cut in the tool supporting plate to form an elongated, biasable, curvilinear gripping finger, which gripping finger has a wall portion that comprises at least one half of the circumference of the non-circular walled bore; inserting a tool into the non-circular walled bore in the tool supporting plate; and biasing the elongated, curvilinear gripping finger into a distorted circular configuration so as to form a snug tool gripping circular wall about the tool inserted therein. The elongated curvilinear gripping finger is biased by an adjustable bolt member. The curvilinear cut has a first end which extends into the wall of the bore in the tool supporting plate. The adjustable bolt has a longitudinal axis which is in alignment with the first end of the curvilinear cut in the tool supporting plate.

The invention also comprises a solid tool gripping and alignment plate, for accurately gripping and holding in perfect alignment, a tool placed therein, comprising: a flat unitary tool gripping plate; an irregular opening formed in the tool gripping plate, for gripping a tool therein; a biasing member for biasing a portion of the irregular opening in the tool gripping plate from a non-circular shape into a circular shaped opening for circumferentially gripping a tool therein. The irregular opening is preferably comprised of a pair of generally semi-circular curves each having its own center of curvature. One of the semi-circular curves comprising the irregular opening is preferably comprised of a pivotable, generally "J" shaped finger member for about one-half of its inner periphery of the opening. The shaped finger member is defined by a generally "J" shaped cut through the plate from a first point on its inner periphery, semi-circumferentially about the inner periphery, to an end point radially outwardly of the pivot point of the "J" shaped finger member. The generally "J" shaped finger member, when biased, pivots about a location on the inner periphery of the opening opposite the location of the first point of the cut on the inner point of the opening. The biasing member comprises an adjustable threaded member extending through a side wall of the plate, in biasing abutment with a side portion of the "J" shaped finger member, and is in axial alignment with the first point of the side wall of the irregular shaped bore in the plate.

BRIEF DESCRIPTION OF THE DRAWINGS

The objects and advantages of the present invention will become more apparent when viewed in conjunction with the following drawings, in which.

DETAILED DESCRIPTION OF THE PREFERRED EMBODIMENTS

Figure 1:
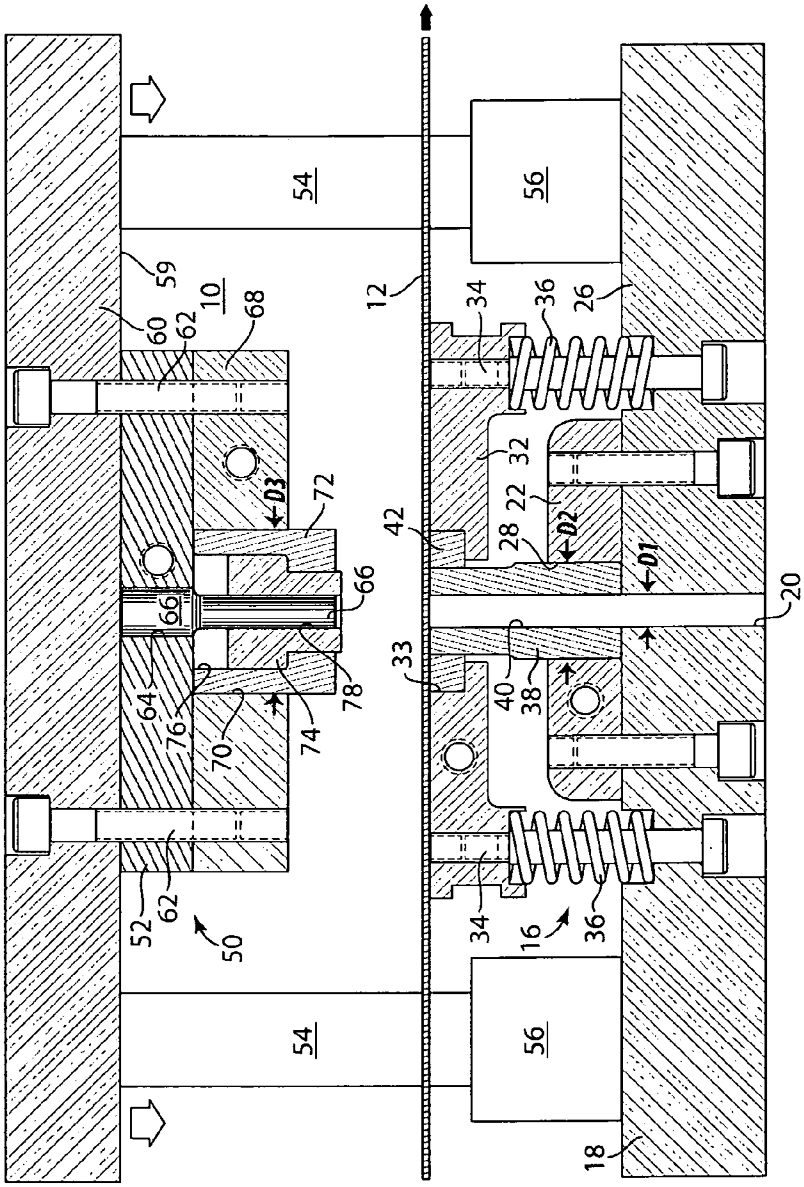
FIG. 1 is a side elevation view in section of a compound die assembly and a sheet of material passing therewithin to be punched by a punch and die arrangement including an arrangement of flexible gripping members for readily aligning and securing those punch and die components therein.
Figure 2:
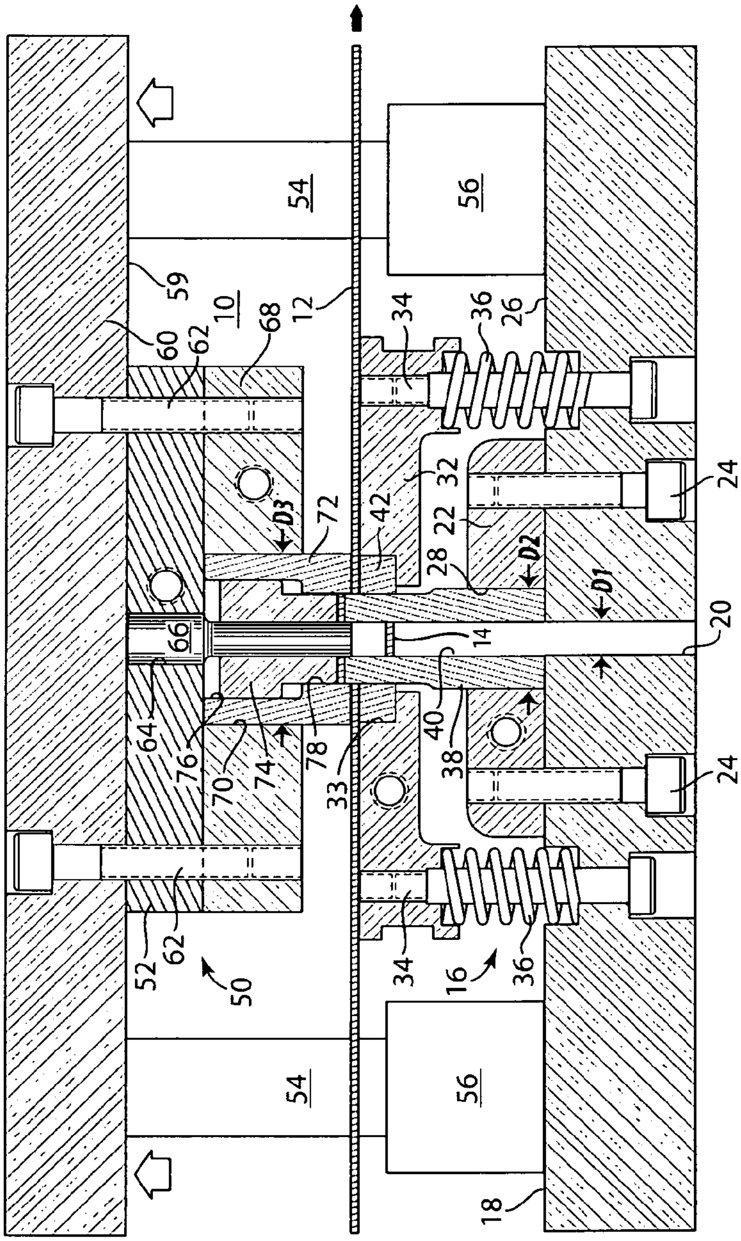
FIG. 2 is a side elevation view of the compound die assembly shown in FIG. 1, with the gripped punch and die components mating and piercing the sheet of material passing therebetween.

Referring now to the drawings in detail and particularly to FIGS. 1 and 2, there is shown the present invention which comprises a die set assembly or arrangement 10 for the manufacture of punched parts from a traveling web or sheet of material 12 such as metal or plastic to produce washers 14 or the like.

The die set assembly or arrangement 10 of the present invention comprises a base portion 16 which comprises a lowermost die shoe 18. The lowermost die shoe 18 has a central bore 20 of a first diameter D1, extending therethrough.

A compound punch holder plate 22 is attached, by an arrangement of bolts 24, to the upper side 26 of the die shoe 18 and has a central bore 28 extending therethrough, of a second diameter D2. A stripper holder plate 32 is reciprocably supported on an arrangement of shoulder screws 34 arranged between the lowermost die shoe 18 and the stripper holder plate 32 itself. Die springs 36 compressibly support the stripper holder plate 32 over the compound punch holder plate 22.

An elongated compound punch 38 is secured in component-controlled coaxial alignment by a gripping finger means "G", described hereinbelow, within the second diameter bore 28 of the compound punch holder plate 22, and has a lower end which rests upon the upper side of the die shoe 18, as may be seen in FIGS. 1 and 2. The compound punch 38 extends into the reciprocably displaceable stripper holder plate 32. The compound punch 38 has a bore 40 in coaxial alignment with the bore 20 in the lowermost die shoe 18. A stripper ring 42, is securably seated in component-controlled co-alignment within an annular shoulder 33 of the holder plate 32, and which stripper ring 42 also slidably surrounds the uppermost end of the compound punch 38 within the reciprocably displaceable stripper holder plate 32.

The die set arrangement of the present invention also comprises an upper portion 50 which comprises the upper center punch holder plate 52. The upper center punch holder plate 52 is disposed parallel to and reciprocably movable toward and away from the stripper holder plate 32 on the base portion 16 of the die set arrangement 10, as may be seen from the representation in FIGS. 1 and 2. The punch holder plate 52 is supported on guide pins 54 which are received in guide bushings 56 at their lowermost end, as represented in FIG. 1. The center punch holder plate 52 is bolted to the lower side 58 of the punch holder 60 by an arrangement of bolts 62. The center punch holder plate 52 has an commonly co-axially aligned adjustable bore 64 which grips, by a gripping finger means "G", described hereinbelow, a commonly co-axially aligned center punch 66 therewithin, which gripping finger means "G" as noted, is described hereinbelow. A die holder plate 68 is also supported by those same pins or bolts 62 onto the lower side of the punch holder 60 as may be seen in FIGS. 1 and 2. The die holder plate 68 has an adjustable central bore or opening 70 of a third diameter D3. The opening 70 in the die holder plate 68 is arranged to adjustably enclose and align a die member 72 therewithin, by another commonly aligned gripping finger means "G", described hereinbelow. The die holder plate 68 also encloses an annular, compressible, reciprocably movable knockout member 74 within the bore 76 of the die member 72. The compressible annular knockout member 74 has a central bore 78 through which the center punch 66, supported at its upper end against the lower side 58 of the punch holder 60, by the center punch holder plate 52, as shown in FIGS. 1 and 2. The knockout member 74 temporarily compresses as the punch 66 strikes the material 12 to be pierced.

Reciprocating motion of the upper portion 50 of the die set arrangement 10, with its die 72 arranged downwardly therefrom, impacts the sheet of material 80 moving across the stripper holder plate 32 supported on the lower portion 16 of the die set arrangement 10, during the traveling of that web of material 80 moving therebetween, to effect the manufacture of a punched part 14 by virtue of the center punch 66 and the die 72 mating with the compound punch 38 and its associated stripper ring 42 and the stripper holder plate 32.

The concentric co-axial alignment each of the center punch 66 and compound punch 38 and associated die components is critical to the proper manufacture of a proper punched part 14.

The center punch holder plate 52 and the die holder plate 68 in the uppermost portion 50 of the die set arrangement 10, and the stripper holder plate 32 and the compound punch holder plate 22 in the lower portion 16 of the die set arrangement 10, each utilize their own gripper means "G", comprising a flexible generally "J" shaped gripping member or grip arrangement 84 to secure the center punch 66, the die 72, stripper holder 42 and the compound punch 38 respectively, as tool components efficiently securely in co-axial alignment within their commonly aligned bores in their respective holders (plates) 52, 68, 32 and 22.

Figure 3:
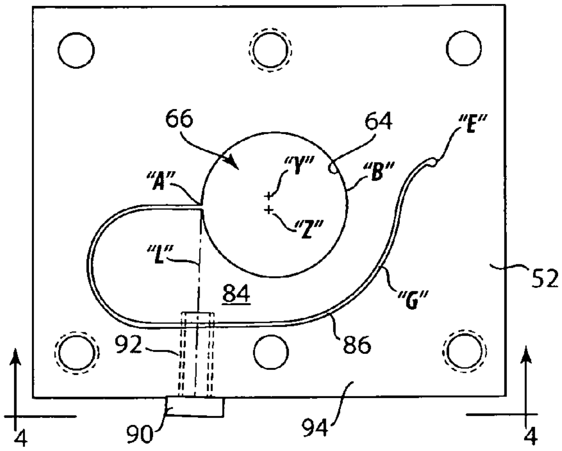
FIG. 3 is an exemplary plan view of a center punch holder plate.
Figure 4:
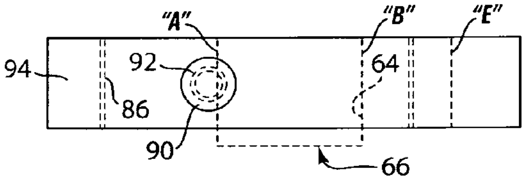
FIG. 4 is a view taken along the lines 4-4 of FIG. 3 showing the center punch holder played in a side view.
Figure 5:
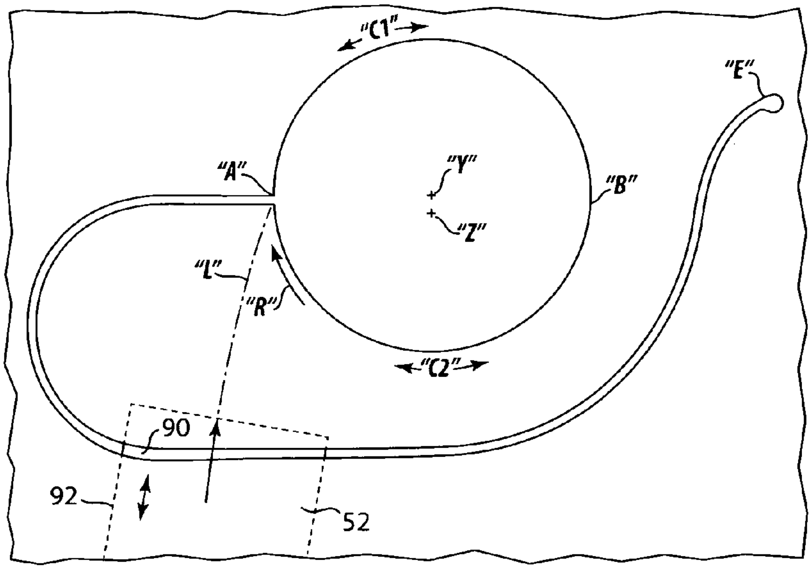
FIG. 5 is an enlarged exemplary plan view of the compound die holder plate.

Such gripper means "G" comprises the generally "J" shaped, flexible gripping finger 84, with its inner peripheral, (semicircular) tool engaging surface, and is shown in an exemplary manner in FIGS. 3, 4 and 5.

The center punch holder plate 52, shown in FIGS. 3 and 4 as an example of the gripper means "G" cited hereinabove, has its adjustable central bore 64 for squeezably pinching and holding a tool (i.e. here, center punch 66 in phantom) concentrically therewithin, with respect to adjacent tool holding plates 68, 32 and 22, as represented in FIGS. 1 and 2. The central bore 64 in the exemplary center punch holder plate 52 is slightly "out of round". A generally "J" shaped cut 86 is made through the holder plate 52, as shown in the example in FIG. 3. That "J" shaped cut 86 begins as a gap at one location "A", as a first point on the inner periphery of the bore 64 and extends circumferentially around and beyond 180° from that one location "A", as represented in FIG. 3, and extends to a radially extended location "E", in a curved point circumferentially and radially beyond point "B". The bore 64 has a first semicircular configuration "C1" extending from location "A" to point "B", and has a second semicircular configuration "C2" extending from point "B" as presented in FIG. 3. The bore 64, is thus irregular (i.e. non-circular) when it is originally machined. Each semicircular configuration "C1" and C2" has its own center of curvature "Y" and "Z" respectively.

A finger biasing member 90 is threadedly received into a bore 92 in the side 94 of the plate 52 as represented in FIGS. 3 and 4. The biasing member 90, such as a bolt or the like, has a longitudinal axis "L" which is in alignment with the location "A", and a midpoint in the gap thereat. Advancement of the biasing member and 90 against the finger 84 effects a tightening of that elongated, curvilinear finger 84, to pivot the finger 84 slightly around the location "B", (which is generally diametrically opposite the first point "A", the location of the cut through the side wall of the bore 64), thus forming that bore 64 into a perfect circle, and thus tightening that gripping finger 84 about the center punch 66. Retraction of that biasing member 90 from its threaded bore 92 removes the bias from the gripping finger 84, so as to loosen its grip on the member received therewithin, which in this exemplary case is the punch 66, thus returning the bore 64 to its undistorted, non-circular state.

The adjustment bolt 90 is thus adjustably disposed within that threaded bore 92 so as to effect (or release) a bias on the radially outward side of the cut 86, when that adjustment bolt 90 is rotated within that bore 92. That generally "J" shaped, yet generally semicircular cut 86 through the exemplary center punch holder plate 52 in effect creates the "flexible grip" finger 84. A bias inwardly by the adjustment bolt 96 against the finger 84 presses that finger 84 slightly (about for example, one half of a degree) inwardly radially, as indicated by arrow "R" in FIG. 5, so as to distort the pre-biased "irregular" distorted non-circular bore 64 into a biased "now circular" bore and hence create a accurate tool-gripping perfect circular hole within that central bore 64. When for example, a tool such as for example, a center punch 66 is placed within for example, the center punch holder plate 52, and its respective adjustment bolt 90 is adjusted and tightened with respect to that gripping finger 84, the center punch 66 is squeezed tightly within a now biased-induced perfect, tool receiving circular hole 64 therewithin. By aligning the respective center bores 64, 70, 33 and 28 of the adjacent holder plates 52, 68, 32 and 22 respectively within the upper portion 50 and the lower portion 16 of the die set arrangement 10 by virtue of their commonly machined and aligned bolt holes shown in the figures, the respective matable tool components secured respectively therein may be efficiently held and easily removably changed and re-inserted in perfect axial alignment. In one preferred embodiment of the present invention, the center punch holder plate 52, the die holder plate 68, the stripper holder plate 32, and the compound punch holder plate 22 all may have an initial pilot bore drilled therethrough to establish the initial alignment thereof. The slight irregularity of those respective bores may be machined when the generally semi-circular cut 86 is made in each respective holder plate 52, 68, 32 and 22. Thus when a tool such as for example, the center punch 66 is clamped within its respective holder plate 52, that irregular bore 64 within that holder plate 52 becomes a perfect circle by the biasing of the finger 84 by the adjustment bolt 96. When no tool is clamped within the respective holder plates, the bore within those respective holder plates returns to its irregular and "out of round", awaiting receipt of a tool therein.

I claim:

1. A solid tool gripping and alignment plate, for accurately gripping and holding only a single tool placed therein in a perfect circle, the tool gripping and alignment plate consisting of:

a flat unitary single-tool gripping plate for gripping only a single tool in a non-circular opening in the gripping plate, the gripping plate having a gap thereacross to define the non-circular opening;

the non-circular opening formed in the tool gripping plate, for contactingly gripping a single tool therein about a single tool's periphery upon adjustment of the gripping plate;

an elongated biasing means consisting of a single threaded adjustment member having a longitudinal axis, the biasing means arranged through a side of the gripping plate, with its longitudinal axis in alignment with the gap in the circular opening, for biasing a "J"-shaped finger member portion of the non-circular opening in the tool gripping plate to change the tool gripping portion of the non-circular opening from a non-circular shape into a perfect circle shaped opening for circumferentially gripping a tool therearound.

2. The tool gripping and alignment plate as recited in claim 1, wherein the non-circular opening is comprised of a pair of generally semi-circular curves each having its own center of curvature.

3. The tool gripping and alignment plate as recited in claim 2, wherein one of the semi-circular curves comprising the non-circular opening is comprised of the pivotable, generally "J" shaped finger member for about one-half of its inner periphery of the opening.

4. The tool gripping and alignment plate as recited in claim 3, wherein the shaped finger member is defined by a generally "J" shaped cut through the plate from a first point on its inner periphery, semi-circumferentially about the inner periphery, to an end point radially outwardly of the pivot point of the "J" shaped finger member.

5. The tool gripping and alignment plate as recited in claim 4, wherein the generally "J" shaped finger member, when biased, pivots about a location on the inner periphery of the opening opposite the location of the first point of the cut on the inner point of the opening.

6. The tool gripping and alignment plate as recited in claim 4, wherein the biasing means comprises an adjustable threaded member extending through a side wall of the plate, in biasing abutment with a side portion of the "J" shaped finger member, and which biasing means is in axial alignment with the first point of the side wall of the non-circular opening in the plate.

7. The tool gripping and alignment plate as recited in claim 6, wherein the center of curvature of each semicircular curve are at a common point when the threaded member is fully adjusted so as to hold a tool within the opening.

8. The tool gripping and alignment plate as recited in claim 3, wherein the shaped finger member extends around the opening for greater than 180 degrees.

9. The tool gripping and alignment plate as recited in claim 3, wherein the opening is comprised of a non-circular shape in the opening's original manufacture.

10. The tool gripping and alignment plate as recited in claim 3, wherein the smooth non-circular opening forms a smooth fully 360 degree tool surrounding opening upon a tightening of the single biasing means.

* * * * *